United States Patent [19]
Feterl

[11] 3,999,520
[45] Dec. 28, 1976

[54] LIVESTOCK FEEDING APPARATUS
[75] Inventor: Leon G. Feterl, Salem, S. Dak.
[73] Assignee: SOS Consolidated, Inc., Birmingham, Mich.
[22] Filed: Aug. 4, 1975
[21] Appl. No.: 601,642
[52] U.S. Cl. ................................................ 119/58
[51] Int. Cl.$^2$ ........................................ A01K 5/00
[58] Field of Search ............. 119/58, 60, 51 R, 16, 119/20

[56] References Cited
UNITED STATES PATENTS

| 445,162 | 1/1891 | Coffin et al. | 119/58 |
| 596,804 | 1/1898 | Bush | 119/58 |
| 2,500,889 | 3/1950 | Wiakler | 119/58 |

Primary Examiner—Hugh R. Chamblee
Attorney, Agent, or Firm—Williamson, Bains & Moore

[57] ABSTRACT

A livestock feeder having a plurality of animal feeding openings includes feed-holdback apparatus for preventing unnecessary waste of feed. The feeder comprises a support frame having a floor surface and at least one vertically extending side wall comprised of elongated upwardly extending pipe segments. A feedreceptive enclosure is defined between the side wall and the floor surface and is accessible to the livestock through a plurality of animal feed openings disposed within the vertical walls between the pipe segments therein. The holdback means comprises substantially C-shaped brackets which include an upper and lower horizontal portion and an integral vertical portion extending between the horizontal portions. The horizontal portions of the holdback structures include means for attaching same to the vertical segments of the side walls. The holdback apparatus defines a feeding compartment into which livestock may extend their heads for eating feed within the apparatus. Importantly, the holdback apparatus slows the rate at which food may be withdrawn from the feeder and prevents unnecessary waste. The latter effect is enhanced by an elongated trough which extends along the feeder frame at the bottom of the side walls and which prevents discarded food from falling to the ground. The means whereby the holdback apparatus is mounted to the side wall of the feeder is adjustable to permit movement of the holdback means upwardly and downwardly with respect to the frame and inwardly and outwardly with respect to the feed enclosure thereby enabling the apparatus to accommodate a plurality of different sized livestock.

11 Claims, 6 Drawing Figures

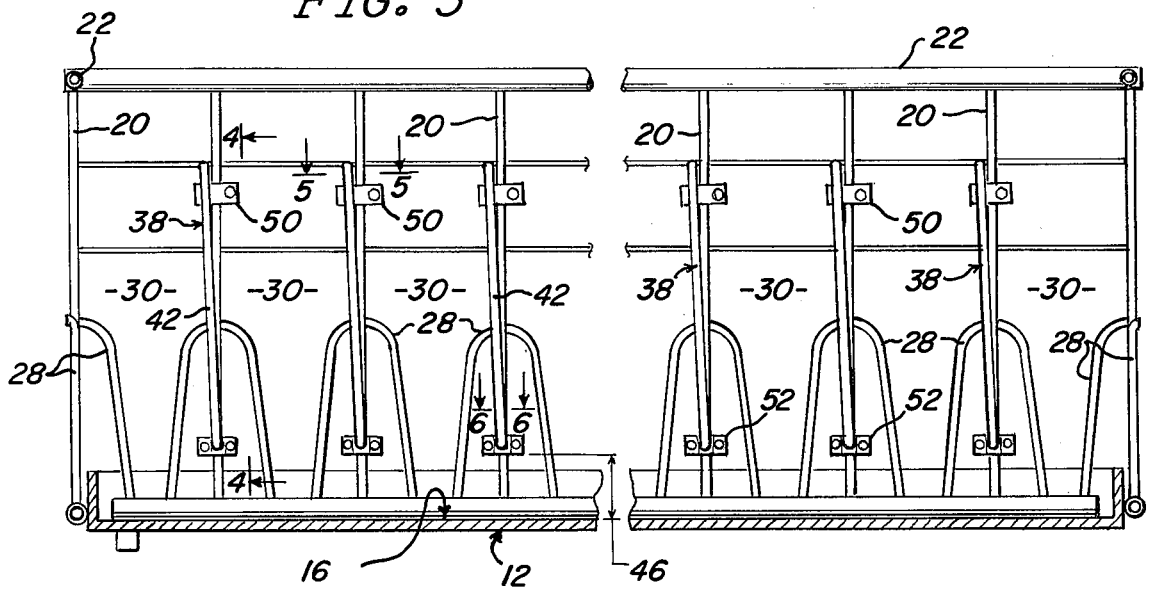
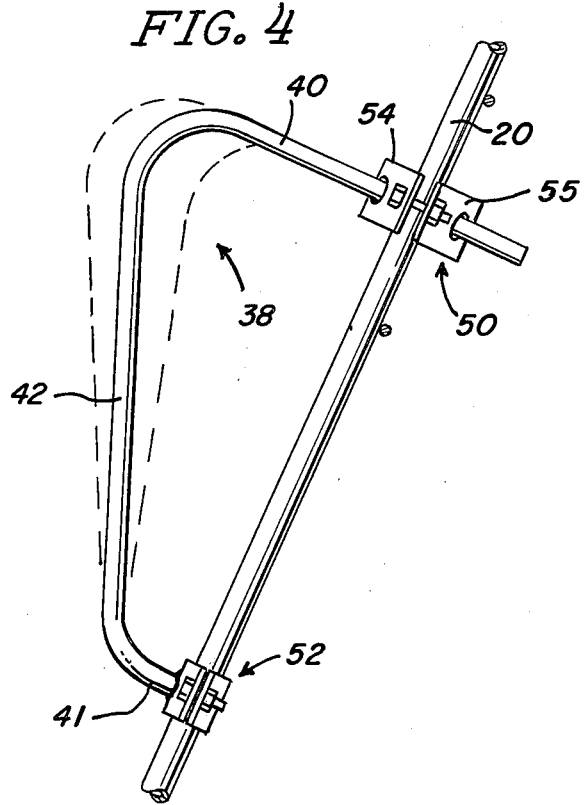
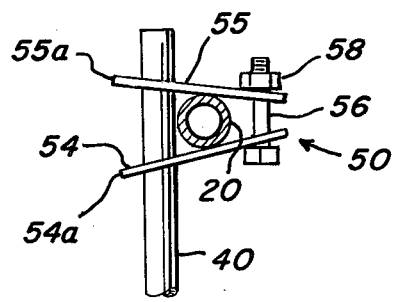
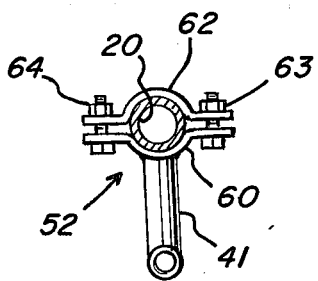

LIVESTOCK FEEDING APPARATUS

BACKGROUND OF THE INVENTION

This invention relates broadly to animal feeders. More particularly, the instant invention is related to livestock feeders which are adapted to hold and dispense bulk feed to a plurality of livestock of various sizes.

In the prior art numerous techniques have been employed to feed livestock. Many of the prior art devices include a movable wagon which has a feed-receptive internal compartment and a plurality of feeding stations defined in the side wall portions thereof. An advantage to be realized with this type of construction is that separate feed areas are available for each livestock and feed may be continuously distributed from the interior of the feeder in an orderly and efficient manner. One prior art livestock feeder is shown in my U.S. Pat. No. 3,782,333, which issued on Jan. 1, 1974.

One problem associated with some prior art livestock feeders is that loose feed can often escape therefrom and fall on the ground. For example, when cows feed they often pull hay out from the feeder in oversized mouthfulls and loose hay tends to fall on the ground and is lost. It is known to provide side troughs in conjunction with feeding apparatus to prevent or minimize unnecessary dropping of feed, but the effectiveness of such an approach is minimal where large clusters or chunks of feed accumulate on the trough during the feeding process. When a cow, for example, can obtain a full-sized mouthful of feed from the side trough of the apparatus, the animal may tend to step rearwardly therefrom before commencing chewing and loose feed or hay is inevitably lost.

Another problem associated with some prior art animal feeders is that they cannot be readily adjusted to permit feeding of a plurality of different sized animals. When the feeder is adapted for use with larger cattle, for example, smaller heifers will be unable to reach the food within the apparatus through the over-sized feeding compartments therein. If large chunks of feed are too easily accessible to the livestock, the aforementioned waste problem will become significant.

SUMMARY OF THE INVENTION

The livestock feeder disclosed herein comprises an elongated frame portion having a floor surface and a plurality of upwardly extending vertical side walls which cooperate with the surface to define a feed-receptive enclosure. The feeder is in the form of a trailer which may be towed to a feeding area by the operator thereof.

The side walls of the trailer comprise a plurality of vertically extending, preferably steel, tubular bars which are connected at their tops by an elongated tubular brace. Feeding material, such as hay or the like, temporarily dumped within the feed-receptive enclosure, is accessible to the livestock through a plurality of animal feed openings defined between adjacent vertical side wall bar portions. An elongated, inclined trough is provided at the bottom of the side walls to prevent inadvertent spillage of feed.

Importantly, a plurality of individual feeding compartments are defined by holdback members which are rigidly attached to the vertical side wall bar members and which extend interiorly of the feeding apparatus to hold back feed from the side walls. The holdback members thus define a feeding compartment into which livestock may extend their heads in order to reach for food. In this manner larger clumps of feed are maintained deep within the feed-receptive enclosure so that the animals must reach over the side trough to feed. Therefore, as the animals chew the food, smaller loose portions of feed dropped by the animals will be caught by the troughs. In this manner unnecessary waste will be minimized.

The holdback members comprise substantially C-shaped structures having upper and lower horizontal portions and integral vertical portions preferably formed from tubular steel or the like. The horizontal portions are attached to the vertical bars in the side walls via a clamping means which permits adjustable placement of the holdback apparatus along the length of the vertical members. Thus, different sizes of livestock may be accommodated by simply slidably adjusting the attaching means and moving the holdback apparatus to a different vertical position along the side wall. Additionally, a horizontal portion of the holdback means may be slidably received within the attaching device whereby the holdback member may be moved inwardly or outwardly of the feed-receptive area to in effect vary the volume of the feed compartment. The latter construction further enables adaptation of the apparatus to different sizes of animals.

Thus, a fundamental object of this invention is to provide a feeding apparatus which will economically feed a variety of livestock. It is an important feature of this invention that wastage of food due to inadvertent dropping is substantially minimized by the holdback construction described herein.

Another object of this invention is to provide a livestock feeder of the character described which will enable graduated and continual feeding. It is a feature of this invention that after a large mouthful of food is chewed, small clumps of loose feed dropped by the animal will be collected by the trough so that the animal will have a "second chance" at eating dropped food.

Still another object of this invention is to provide a feeder having the characteristics listed above which is readily adaptable for use with a wide variety of different size animals. Since the holdback apparatus employed by this invention can be slidably moved to varying vertical positions along the walls of the feeder, the inwardly extending feeding compartment may be adjusted to prevent even very large animals from continually grabbing oversized chunks of feed.

A related object of this invention is to provide means whereby the volume of the individual animal feed compartments associated with a feeder may be conveniently varied. It is a feature of this invention that the horizontal portion of the holdback means is slidably adjustable so that the holdback apparatus may be moved into or out of the feed-receptive area to accommodate animals having different sized necks.

These and other objects of this invention, along with features of novelty appurtenant thereto, will appear or become apparent in conjunction with the following description.

BRIEF DESCRIPTION OF THE DRAWINGS

In the accompanying drawings, which form a part of the specification and are to be construed in conjunction therewith, and in which like reference numerals have been employed throughout to represent like parts in the various views:

FIG. 3 is a cross sectional view of the animal feeder taken along lines 3—3 in FIG. 2;

FIG. 4 is a cross sectional view taken along line 4—4 in FIG. 3 and showing a holdback member constructed in accordance with the teachings of this invention;

FIG. 5 is a cross sectional view of the holdback apparatus attaching means taken along line 5—5 in FIG. 3; and FIG. 6 is a cross sectional view of the lower attaching means for the holdback apparatus taken along line 6—6 in FIG. 3.

DETAILED DESCRIPTION OF THE DRAWINGS

Figure 1:
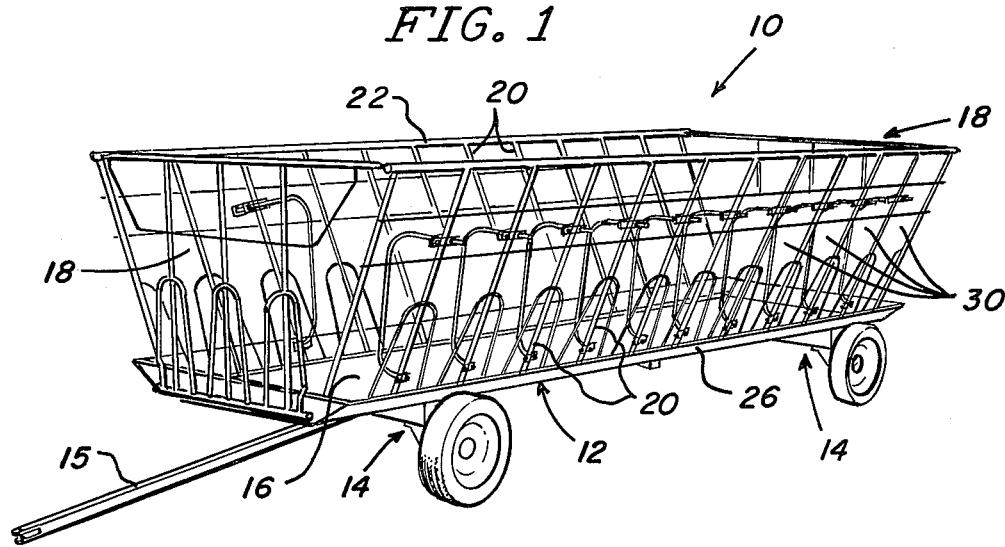
FIG. 1 is a perspective view of an animal feeder constructed in accordance with the teachings of this invention.

In FIG. 1 there is shown an animal feeder 10 which incorporates the teachings of this invention. Feeder 10, which is in the form of a trailer wagon, comprises a lower elongated frame 12 suspended by conventional wheel axle assemblies 14 and adapted to be towed via a conventional tongue 15. Frame 12 includes an inner, planar surface 16 which is surrounded by a plurality of upwardly extending side walls 18. A feed-receptive enclosure is thus defined between walls 18 and inner planar surface 16. Feeder 10 can be towed to the desired feeding location.

Each of the side walls 18 comprises a plurality of vertically extending, preferably tubular, steel rod members or bars 20 which are fastened to frame 12 and which are joined at the upper portions thereof by horizontally extending frame bars 22. Bars 22 are also preferably constructed of tubular steel and are rigidly attached to the upper ends of bars 20 by welding or the like. As shown best in FIG. 2, the lower ends of the bars 20 are rigidly connected to a lower transversely extending elongated frame pipe 24. The bars 20 diverge upwardly and outwardly from the lower frame 12 thereby giving the apparatus a trapezoidal cross sectional profile. However, it should be understood that the invention is not limited to such construction. Inner surface 16 actually comprises the top of a preferably rectangular board 16a which abuts an angled trough 26 at the base of walls 18. As will be discussed in more detail later, the function of troughs 26 is to prevent loose feed from dropping from the mouths of feeding animals onto the ground below. A plurality of generally downwardly diverging U-shaped brackets 28, having their apexes rigidly attached to bars 20 and their lower ends rigidly attached to pipe 24, are provided to add support and strength to the lattice network comprised of the various vertical bars 20.

An animal feed opening 30 is defined between adjacent vertical side wall bars 20, frame surface 16 and upper horizontal frame bar 22. While the lower portion of animal feed spaces 30 is limited in size by adjacent vertical segments of frame strengtheners 28, the upper portions of openings 30 are wide enough to permit entry of the heads of most livestock. Thus, for example, a calf 34 (FIG. 2) may reach through opening 30 to eat feed 36 which is dumped into the feed-receptive enclosure for distribution to the livestock.

Feed 36 may comprise a wide variety of conventional animal feed substances such as hay or the like. Ordinarily, when the feed is dumped into the apparatus, it will come to rest in abutment with the walls 18, such that an animal 34 could partake of the food by merely extending his mouth through opening 30. Of course, an animal feeding in this manner would tend to take a large oversized bite and afterwards withdraw his head from opening 30 for slowly and deliberately chewing the food. After withdrawing his head to chew the food, smaller amounts of food would ordinarily drop to the ground and be lost. To correct this situation, feed holdback members 38 have been added to the apparatus 10.

Figure 2:
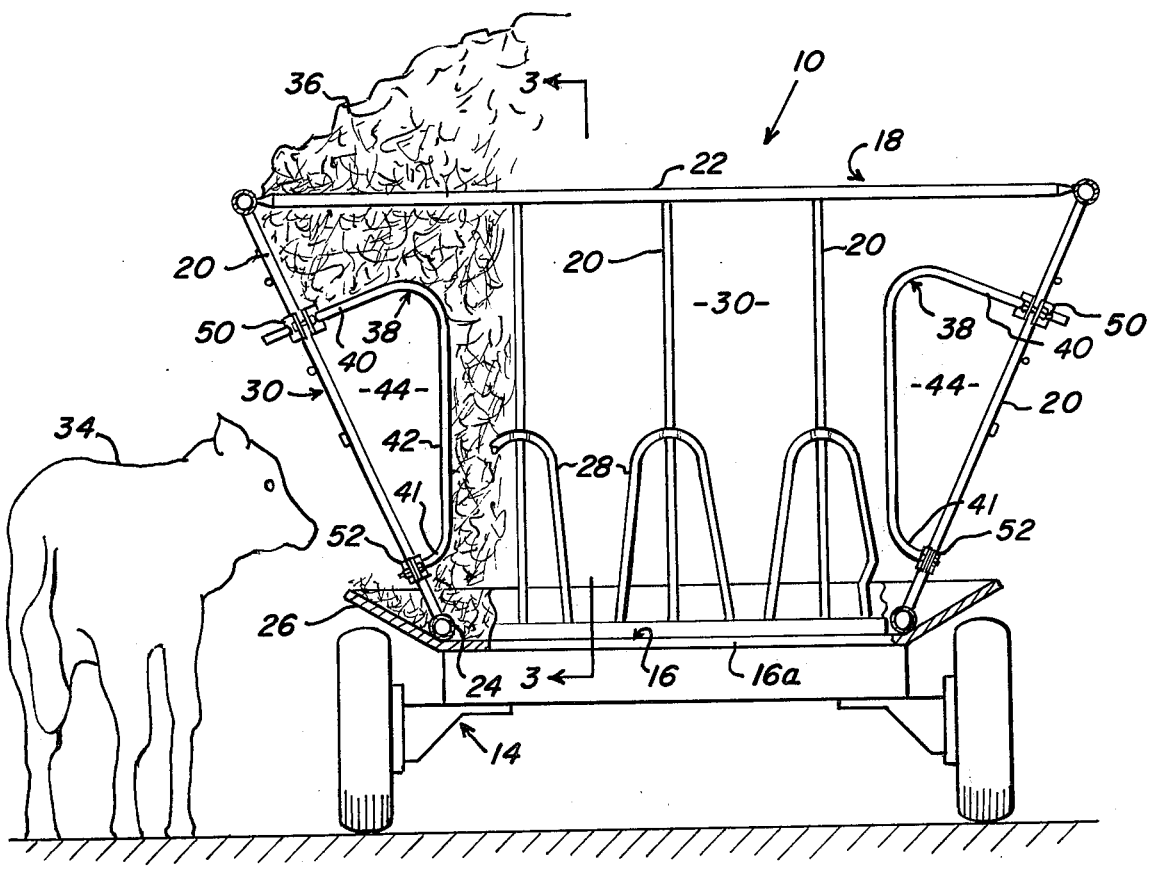
FIG. 2 is a vertical cross sectional view taken transversely of the animal feeder shown in FIG. 1.

Each holdback device 38 comprises a generally C-shaped structure which had an upper, generally horizontal portion 40, a lower horizontal portion 41, and an integral vertical portion 42 which extends between horizontal portions 40 and 41 (FIG. 4). Holdback apparatus 38 is preferably constructed of rigid tubular steel which may be bent into the desired shape by conventional techniques. The holdback apparatus 38 is adapted to be attached to the side wall 18 of the feed wagon 10 and projects inwardly into the feed-receptive area of the feeding apparatus 10 (FIG. 2). In the preferred embodiment holdback apparatus 38 is attached to the vertical members 20 of side wall portions 18. As best seen in FIG. 2, the holdback apparatus 38 defines a feeding compartment 44 into which the animal 34 may extend its head for feeding. It will be noted that apparatus 38 thus prevents the feed 36 from coming into direct contact with that portion of vertical member 20 which lies between horizontal portions 40 and 41 of the apparatus 38.

Holdback apparatus 38 is preferably adjustably mounted so that its position relative to vertical member 20 may be adjusted to accommodate different sizes of livestock. As best seen in FIG. 3, holdback apparatus 38 is spaced apart from floor surface 16a a predetermined vertical distance 46, which may be adjusted to accommodate different sizes of livestock as will be subsequently described. As seen in FIG. 2, the vertical members 20 which define side wall portions 18 preferably diverge upwardly and outwardly from the lower surface 16. Because of this factor it has been found desirable to make upper horizontal portion 40 of apparatus 38 somewhat longer than lower horizontal portion 41 thereof, so that vertical portion 42 will be oriented substantially perpendicular with respect to surface 16 when apparatus 38 is properly installed.

The adjustable attaching means comprises upper and lower mounting portions 50 and 52 respectively. (FIGS. 4–6) Upper mounting portion 50 includes a first clamp plate 54 and a first flange plate 55 which is coupled to clamp 54 with a vertical pipe section 20 compressively engaged therebetween. Each of the plates 54 and 55 include a left aperture (as viewed in FIG. 5) which receives holdback means portion 40, and a right aperture (as viewed in FIG. 5) which receives a conventional bolt 56. A nut 58 received by bolt 56 may be tightened so that plates 54 and 55 will compressibly engage member 20 which is sandwiched therebetween. When bolt 56 is tightened, plates 54 and 55 will pivot about vertical member 20, such that plate ends 54a and 55a respectively will tend to diverge. In this manner holdback means portion 40 will become securely engaged to plates 54 and 55 because of the frictional contact generated within the receptive apertures through which portion 40 extends. By simply loosening nut 58 member 40 can be positioned as desired. Attachment portion 52 (FIG. 6) includes a second clamp plate 60 which is rigidly attached to holdback means portion 41 through welding or the like and a second flange plate 62. Plates 60 and 62 conformingly engage vertical member 20 which is sandwiched therebetween. Plates 60 and 62 are selectively attached to each other by nut and bolt combinations 63 and 64 which should, of course, be tightened after holdback member 38 is appropriately located at the desired elevation along vertical member 20.

Because of the adjustable attachment means just described, holdback member 38 may be moved along vertical member 20 to a variety of vertical positions. Thus offset distance 46 can be varied to accommodate larger or smaller livestock by simply loosening the mounting hardware. Because the holdback member is releasably engaged within the apertures within attachment means 50, it may be moved inwardly or outwardly with respect to the enclosed feed-receiving area in a direction generally perpendicular to the side walls 18 whereby the depths of the feeding compartment can be adjusted as desired to accommodate different sizes of livestock. Thus attachment means 50 permits vertical and horizontal positioning of holdback means 38. In operation a plurality of generally C-shaped holdback means 38 are fastened as desired to side wall portions 20 within the feed-receptive enclosure. Of course vertical offset distance 46 should be appropriate to receive the head of the animal 34 which is to feed. Feed 36 would then be dumped into the feed-receptive area within apparatus 10 and it will be noted that a plurality of feeding compartments 44 will be defined by the holdback apparatus 38. When feeding, the animal will be able to obtain large rough chunks of feed by extending his head into compartment 44, and when the animal backs up his head to chew the food smaller portions of loose feed will drop and be retained by troughs 26. It will be apparent that troughs 26 will normally be maintained in a position under the animal's head because the animal must first extend his head horizontally into the volume 44 to obtain food.

While a preferred embodiment of the present invention has been described, it should be understood that various changes, adaptations and modifications may be made therein without departing from the spirit of the invention and the scope of the appended claims.

What is claimed is:

1. Livestock feeding apparatus comprising:
   a support frame having a planar floor surface;
   side wall means extending substantially vertically upwardly from said frame and cooperating with said surface to define an enclosure for receiving feed therewithin, said wall means comprising a plurality of horizontally spaced apart, elongated, substantially vertical members defining a plurality of feed openings between adjacent ones of said vertical members; and
   means associated with said openings for holding feed back from said side wall means to define a plurality of compartments into which livestock may extend their heads for eating said feed, said holdback means rigidly attached to said side wall means vertical members and extending interiorly of said enclosure, said holdback means comprising an upper portion projecting inwardly from said side wall means and a substantially vertical portion cooperating with said side wall means to define said feeding compartments, said holdback means vertically spaced apart from said floor surface a predetermined offset distance.

2. The combination as defined in claim 1 wherein: said holdback means further includes a lower portion projecting inwardly from said side wall means and forming with said upper and vertical portions thereof a substantially C-shaped holdback device, with said vertical portion thereof extending between said upper and lower portions.

3. The combination as in claim 2 wherein said vertical side wall members diverge outwardly from said floor surface and said upper horizontal portions of said holdback means are longer than the lower horizontal portions thereof, whereby the vertical portions of said holdback means are oriented substantially perpendicular to said floor surface.

4. The combination as defined in claim 2 wherein said vertical side wall members diverge outwardly from said floor surface, and said apparatus includes elongated, inclined trough means extending along said frame adjacent the bottom of said side walls for preventing feed from dropping to the ground.

5. The combination as defined in claim 1 wherein said apparatus comprises means for adjustably attaching said holdback means to said vertical side wall members whereby said predetermined vertical offset distance can be selectively varied to accommodate different sizes of livestock by slidably adjusting said attaching members to a different vertical position along said vertical side wall members.

6. The combination as defined in claim 5 wherein said upper portion of said holdback means is releasably engaged within an aperture in said attaching means whereby said holdback means is movable inwardly or outwardly with respect to said feed receiving enclosure in a direction generally perpendicular to said side wall means, thereby permitting selective adjustment of the volume and depth of said feeding compartment to accommodate different sizes of livestock.

7. The combination as defined in claim 5 wherein said adjustable attaching means comprises:
   a first clamp plate having an aperture defined therein;
   a first flange plate for selective attachment to said first clamp plate whereby said wall means vertical member is compressively engaged between said first clamp plate and said first flange plate, and said first flange plate comprising an aperture adapted to cooperate with said first clamp plate aperture to receive said horizontal portion of said holdback means to selectively secure it in position;
   a second clamp plate for engaging a bottom extension of said vertical portion of said holdback means and adapted to conformingly engage said side wall means vertical member; and
   a second flange plate for selective attachment to said second clamp plate whereby said side wall means vertical member is compressively engaged therebetween at a location below the position of clamping engagement of said upper holdback portion to said side wall means vertical member.

8. In a livestock feeding apparatus adapted to dispense feed to a plurality of animals, said apparatus including a support frame and a plurality of side walls defining a feed receptive enclosure, said side walls including a plurality of substantially vertically upwardly extending members, said substantially vertically upwardly extending members horizontally spaced apart to define a plurality of feeding openings, the improvement comprising:

means associated with said feed openings for holding feed back from said side walls to define a plurality of feeding compartments into which livestock can extend their heads for feeding, said holdback means being attached to at least one of said side walls and extending interiorly of said enclosure therefrom, said holdback means comprising a plurality of holdback devices having upper and lower end portions connected to an intermediate portion cooperating with at least one of said side walls to define a plurality of feeding compartments, said upper and lower end portions being secured to said vertical side wall members at vertically spaced apart locations thereon.

9. The improvement as in claim 8 wherein said feed holdback means comprises a plurality of holdback devices, each having upper and lower end portions connected to an intermediate portion cooperating with at least one of said side walls to define a plurality of said feeding compartments, said upper and lower end portions being secured to one of said vertical side wall members at vertically spaced locations thereon.

10. The improvement as defined in claim 8 wherein said upper and lower portions of said holdback devices are releasably attached to said substantially vertical side wall members, whereby the vertical position of said holdback means relative to said frame can be varied to accommodate different sizes of livestock by moving said holdback means upwardly or downwardly with respect to said apparatus frame.

11. The improvement as defined in claim 10 wherein at least one of said end portions of said holdback means is releasably, slidably received within an aperture in attaching means affixed to said substantially vertical side wall members whereby said holdback means is movable inwardly or outwardly with respect to said feed receptive enclosure in a direction generally perpendicular to said side wall, thereby varying the volume of said feeding compartment to selectively accommodate different sizes of animals.

* * * * *